INVENTORS
EUGENE O. ENGELS
ERVIN V. WAACK
BY
Fearmant Fearmant
ATTORNEYS

INVENTORS
EUGENE O. ENGELS
ERVIN V. WAACK
BY
*Learman+Learman*
ATTORNEYS

INVENTORS
EUGENE O. ENGELS
ERVIN V. WAACK
BY
Fearman + Fearman.
ATTORNEYS

INVENTOR.
EUGENE O. ENGELS
ERVIN V. WAACK

ATTORNEYS

INVENTORS
EUGENE O. ENGELS
ERVIN V. WAACK

BY
*Harman, Harman & McCulloch*

ATTORNEYS

INVENTORS
EUGENE O. ENGELS
ERVIN V. WAACK

ATTORNEYS

INVENTORS
EUGENE O. ENGELS
ERVIN V. WAACK

BY

ATTORNEYS 3,085,519
DOUGH HANDLING MACHINES
Eugene O. Engels, Saginaw, Mich., and Ervin V. Waack, Springfield, Pa., assignors to Baker Perkins, Inc., Saginaw, Mich., a corporation of New York
Filed Nov. 4, 1957, Ser. No. 694,158
28 Claims. (Cl. 107—8)

This invention relates to dough handling machines and more particularly to twisting machines of the kind adapted to twist or treat dough pieces in accordance with a predetermined plan.

Various machines have been designed for the purpose of mechanically twisting or intertwining a pair of dough pieces to form a bread loaf, but not all of them have been capable of performing efficiently and reliably, with the result that the machines have not appeared on the market and the twisting of dough pieces to produce an improved loaf has continued to be accomplished manually in bakeries for the most part. Typical of the prior machines are those that employ continuously operating twisting units and loading traps actuated by the weight of the dough pieces being supplied to the twisting units. One of the difficulties with machines of this design is that the dough pieces must be supplied to the twisting head at a definite predetermined rate in uniformly spaced relation which, in practice, is difficult to accomplish. Alternatively, complex interlocking mechanism must be provided to prevent the traps from charging dough pieces to the twisting units when they are not ready to receive them. When the spacing between dough pieces being fed to the machine is greater in some instances than that at which the machine is designed to operate, the twisting units will operate prior to the time the dough pieces can be charged to them by the traps and some of the pans underneath the twisting units will pass empty to the proofer if not removed. If the rate at which dough pieces are being supplied is increased, or if the spacing between dough pieces is less than the specified distance, they will soon load the traps and pile up. Further, gravity operated traps rarely operate without pinching and deforming some of the dough pieces which may be supplied in different sizes and weights. The relatively complex locking mechanism designed to integrate the operation of the gravity traps of such machines to prevent the formation of "doubles" or overlarge dough pieces and to prevent the charging of the dough pieces when the twisting units are not in a position to receive them is expensive and adds considerably to the cost of producing such a machine.

While machines have also been proposed wherein the initial receiving trap was operated by the force of travel of the dough pieces proceeding into the machine on a conveyor or the like, and the pairing trap beneath was gravity operated by the weight of dough pieces fed thereto, such machines are not entirely practical because the pressure required to operate even the first mechanical trap at the high rate of speed and with the force required cannot be produced by the dough piece without detrimental deformation thereof. Further, the gravity operated pairing trap cannot operate with the speed required and will pinch the dough piece and rupture its skin when the trap is gradually opened by the weight of the dough piece charged thereto. It must be remembered that the individual dough pieces proceeding to the machine may weigh only 8 or 9 ounces apiece.

Another difficulty with prior machines is their inability to permit substantial variations in the manner a dough piece is treated. One of the prior machines will permit a pair of dough rolls to be given either three or four twists, but none of the machines designed heretofore is capable of functioning reliably as either a twisting unit or as a single panning unit, that is, a unit in which a single dough piece is deposited in a pan without being twisted. As a result, a mechanized bakery producing both twisted and conventional bread loaves has had to be equipped with a single panning unit and a twisting unit. The cost of equipping a bakery with both machines is high, and valuable floor space is taken up by the two machines.

One of the prime objects of the instant invention is to provide a fully interlocked twisting machine in which the momentum of the dough pieces traveling to the machine need be depended upon only to trip motor powered means for cyclically operating the various traps and twisting elements so that the traps and elements may be operated with sufficient force and speed to carry out efficiently and rapidly their assigned functions regardless of the weight and size of the particular dough pieces being processed. Briefly, the invention comprises interlocked, motor-driven mechanism for operating the traps, twisting units, and pan stop control in correlation with the feed of dough pieces to the machine.

Another object of the invention is to design a simple and practical twisting machine of the type described in which the various elements can receive dough pieces only in correlation with the feed of successive dough pieces to the machine.

Still another object of the invention is to design a twisting machine in which the operation of the selector and pairing traps can be controlled by cams on a single cam shaft which is revolved intermittently in accordance with the spacing of the dough pieces on the approach conveyor.

A further object of the invention is to design a twisting machine of the type described in which the means for actuating the twisting units, twisting unit traps, and pan stop control cannot be operated except when the mechanism for actuating the selecting and pairing traps is operating.

A further object of the invention is to design a twisting machine of the type described which in no manner injures the dough pieces or deforms them so they cannot be twisted properly.

A further object of the invention is to design a twisting machine in which the correlation of the operative elements need not be dependent on the rate of travel of a supplying flight conveyor which may not always pick up a dough piece, and often damages the dough pieces it is selecting for transport.

Another object of the invention is to design a twisting machine in which the interlocking mechanism for the various elements is in no manner affected or controlled by the weight of the dough pieces proceeding through the apparatus.

Another object of the invention is to provide a dough piece handling machine which is capable of twisting dough pieces a selected number of times and, alternatively, operating as a single panning unit by depositing single untwisted dough pieces directly into pans.

A further object of the invention is to provide improved means for detecting and eliminating oversize dough pieces.

Still a further object of the inventoin is to provide improved apparatus for depositing twisted dough pieces in pans in such manner that the tendency of the twisted rolls to untwist is overcome.

A still further object of the invention is to design a twisting machine which is reliable and efficient in operation, relatively compact, capable of sustained operation without failure, and can be very readily manufactured and assembled at a low cost which makes it practical for bakeries of moderate capacity.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

A twisting machine which includes apparatus by which dough pieces may be extended and fed to machines constructed in accordance with the invention is disclosed in Patent No. 2,337,527, granted December 21, 1943, to R. P. Steadman et al. on a divisional application of application Serial No. 413,924, filed October 7, 1941, now Patent No. 2,337,526.

Figure 1:
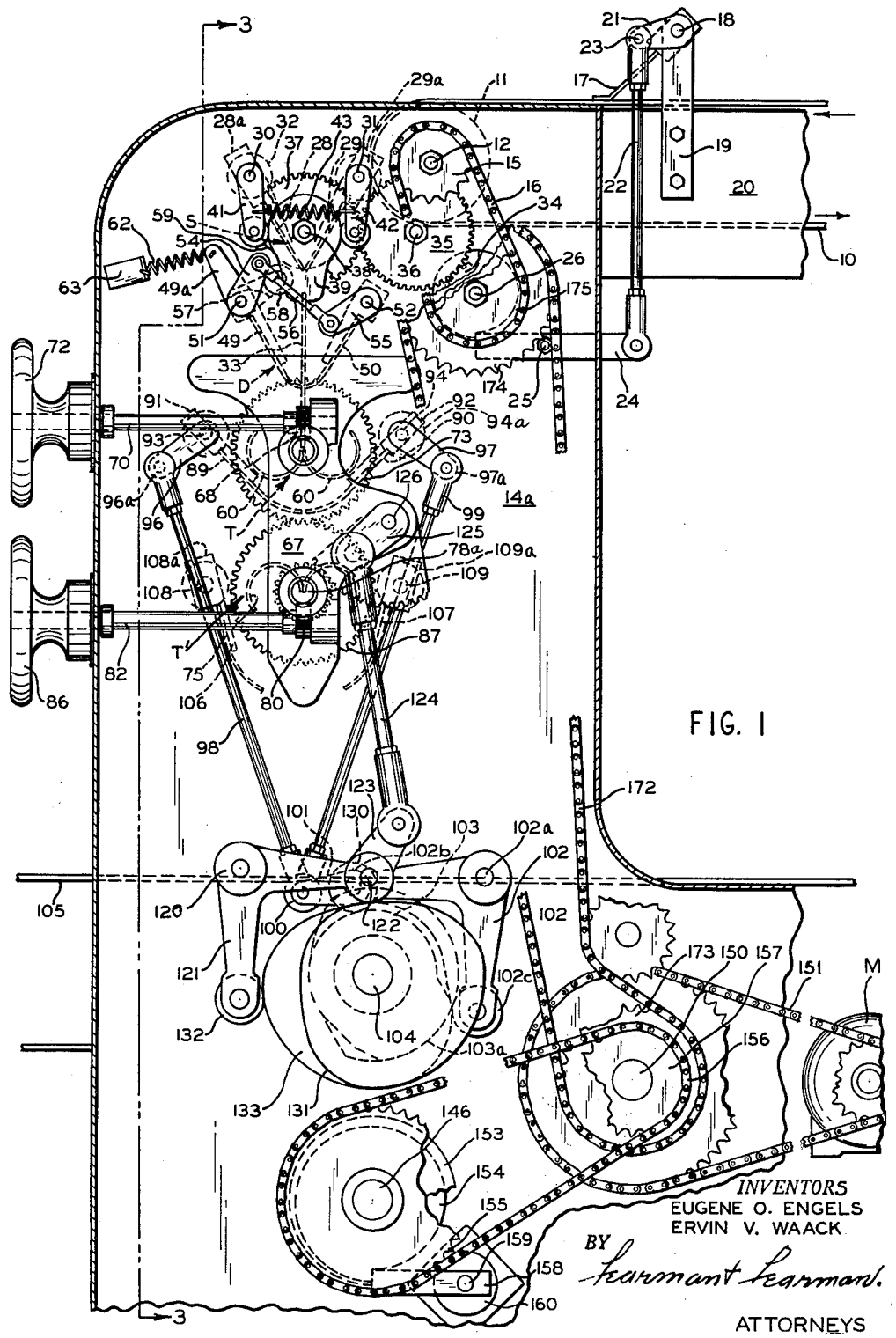
FIGURE 1 is a sectional, side elevational view through one of the side casings of the twisting machine frame illustrating the mechanism housed therein.
Figure 2:
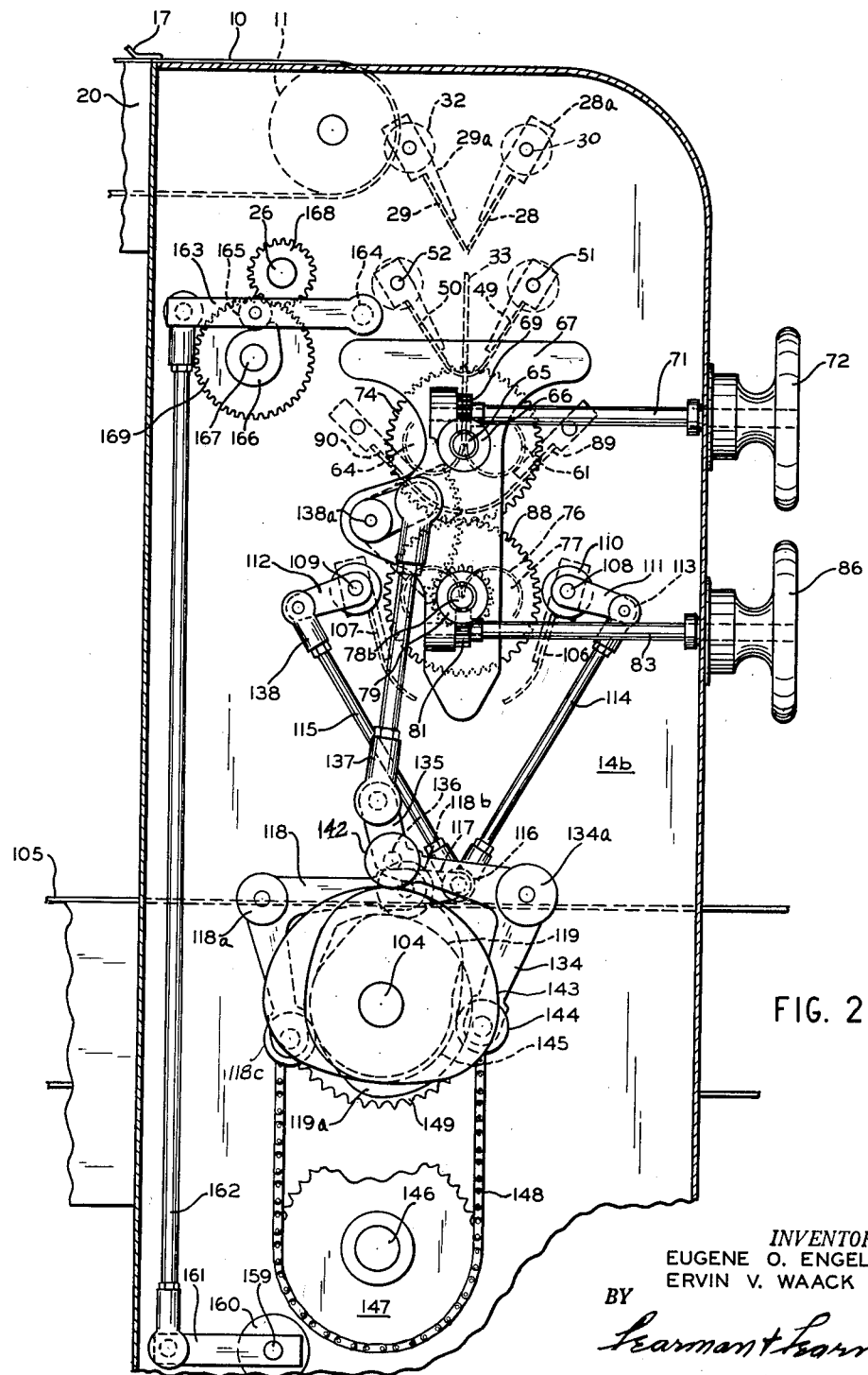
FIGURE 2 is an opposite sectional side elevational view through the other side casing or housing.
Figure 3:
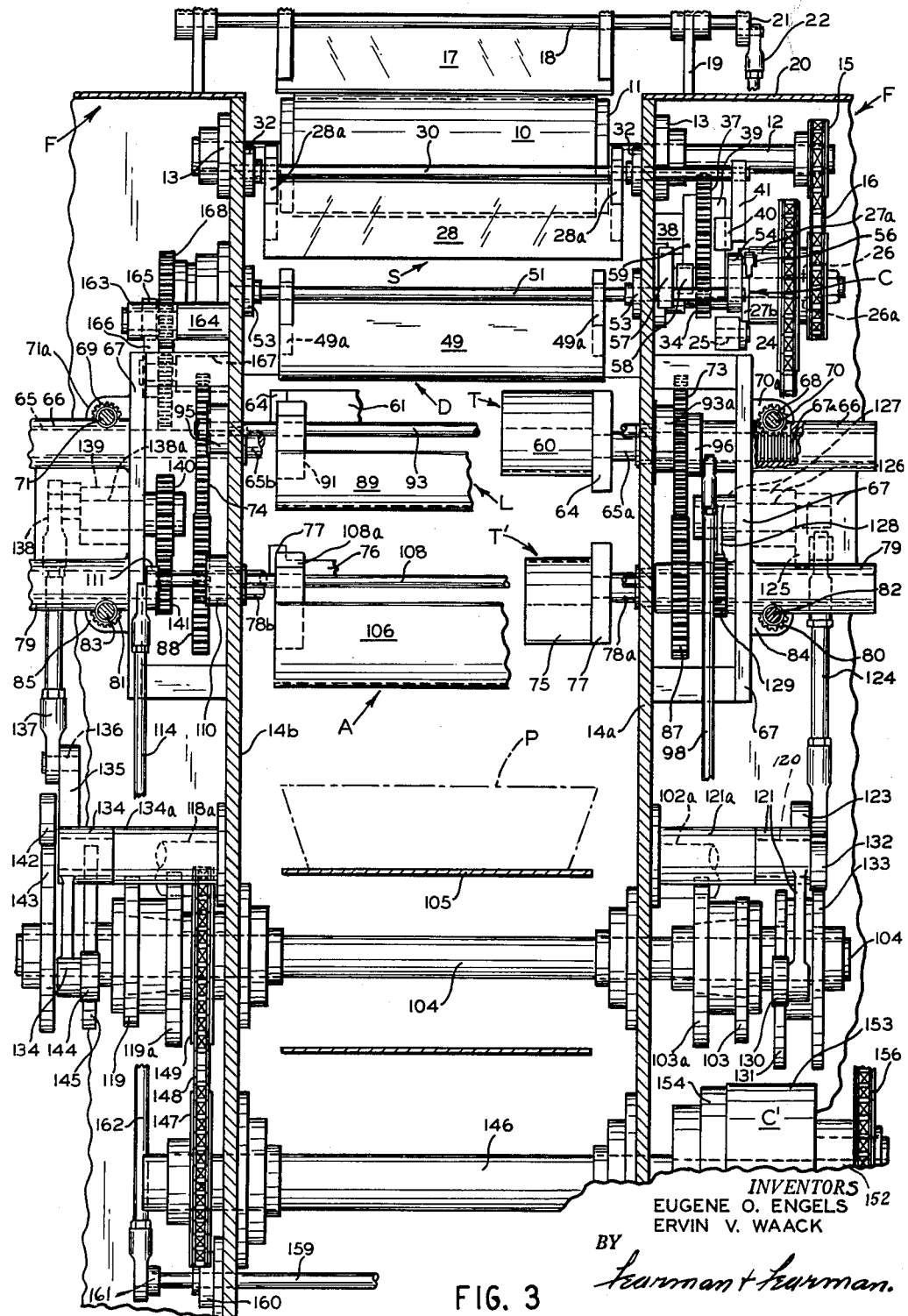
FIGURE 3 is a view taken on the line 3—3 of FIGURE 1.

Referring now in detail to FIGURES 1–4 of the accompanying drawings wherein is disclosed one embodiment of the invention, and more particularly to FIGURE 3, letters F generally indicate transversely spaced apart side housings which comprise the twisting head of a dough piece twisting machine. The complete frame is similar to, or could be identical with, the frame shown in the Steadman patents previously referred to, and accordingly the remainder of the frame structure will not be shown or described. Preferably, the outer walls of the housings F will be removable to afford access to the interior thereof.

An endless conveyor 10 shown leading between the side frames or housings F adjacent the upper ends thereof carries dough pieces or rolls which have been elongated by extender mechanism of the general type mentioned in the foregoing patents. Since the extender unit or units form no part of the instant invention, however, they need not be shown or described in this specification. The belt 10 is trained around a roll or sheave 11 mounted on a shaft 12 which is journaled in bearings 13 provided on the opposite inner side walls 14a and 14b of the frames. The right end of the shaft 12 (FIGURE 3) has a drive sprocket 15 thereon which is continuously driven by a chain drive 16 in a manner which will be later described.

Located forwardly of and slightly below the conveyor 10 in a position to receive the dough pieces therefrom is a selector trap S for releasing dough pieces alternately to the opposite sides of a partitioned division trap D. While the trap S cannot be operated except when a dough piece is actually moving toward it on the conveyor 10, as will be explained, still the trap is positively actuated by drive mechanism which operates rapidly and reliably and does not depend on the weight or resistance to deformation of the dough piece alone to operate the trap mechanism. In the machine of the instant invention the dough piece initiates the action through actuating means such as a gate or flap 17 which extends into the path of the dough piece and which is operable to release a motor supplied force for positively actuating the trap. The gate 17 is rigidly mounted on a shaft 18 which is journaled in bearing brackets or blocks 19 provided on upper extensions 20 of the walls 14a and 14b. Also rigid on the shaft 18 is a crank arm 21 which is pivotally joined to the upper end of a connecting rod 22 as at 23. The lower end of the rod 22 is pivotally connected to a clutch restraining arm 24 which is pivotally supported at 25. Mounted on a shaft 26 is a Hilliard clutch C (see Patent No. 2,140,737) including a driving member 27a fixed to a sleeve 26a on the outer portion of the shaft 26 and a driven, one toothed ratchet wheel 27b is fixed directly to the inner portion of the shaft 26 and is adapted to be driven by the wheel 27a. As will be apparent, the wheel 27b will be carried through one revolution by the driving member 27a when the detent 24 is momentarily disengaged, but will not again revolve until the gate 17 is raised by the succeeding dough piece. The members 27a and 27b are automatically disengaged when the detent 24 comes into contact with the tooth on the wheel 27b and are automatically re-engaged or rehabilitated when the detent 24 is lowered.

The trap S comprises a pair of independent doors or plates 28 and 29 rigidly supported by pairs of arms 28a and 29a which may be welded or otherwise suitably fixed to rock shafts 30 and 31. The latter shafts are journaled in bearings 32 provided on the side walls 14a and 14b of the frames and will be positively actuated when the clutch wheel 27b is revolving in a manner which will now be described to open and close the trap S. The trap operating mechanism must alternately actuate the plates 28 and 29 to drop a doughpiece first on one side of the central partition 33 of a pairing trap D and then on the other. A suitable mechanism may comprise gear 34 on the shaft 26 in mesh with an idler gear 35 on a shaft 36. The gear 35 drives a gear 37 on a shaft 38 and accordingly revolves a single lobe cam 39 on the same shaft and which has engagement with rollers 40 on a pair of follower arms 41 and 42, the latter being fixed to the shafts 30 and 31, respectively. A spring 43 connected between the arms 41 and 42 maintains the rollers 40 in engagement with the cam 39. The diameter of gear 34 is only half the diameter of gear 37, so the cam 39 will travel through only half a revolution while the gear 34 is moving through an entire revolution, and the arms 41 and 42 will be alternately actuated by the lobe of the cam 39 on successive revolutions of the clutch member 27b. Thus, the trap doors 28 and 29 will be opened alternately and dough pieces will be dropped alternately to the converging trap doors 49 and 50 of the pairing or division trap D.

The doors 49 and 50 are supported on arms 49a and 50a and depend rigidly from shafts 51 and 52 and constitute a pairing station in that neither will open without the other also opening. While the doors are rigidly secured on separate rock shafts 51 and 52, respectively, which are journaled in pairs of bearings 53 on the adjacent side walls 14a and 14b, the shafts are connected through arms 54 and 55 fixed on the shafts 51 and 52, respectively, which are joined by a connecting rod or link 56. Thus, if the trap door 49 is opened, the door 50 also will be opened by the linkage 54, 55, and 56.

Rigidly mounted on the rock shaft 51 is an arm 57 with a follower roller 58 thereon which rides on a second cam 59 on the control shaft 38 that operates to open and close the trap doors 49 and 50 in timed sequence with the opening and closing of the trap S. The cams 39 and 59 are arranged on the shaft 38 so that the doors 49 and 50 are opened only when the doors 28 and 29 are in closed position. Thus, there is never any possibility of dough pieces dropping through both of the traps S and D to the first twisting unit T.

The unit T comprises a pair of longitudinally aligned, double twisting cups 60 and 61 which are centered below the point of convergence of the doors 59 and 50. The trap door 49, and consequently the trap door 50 also, is almost immediately returned to closed position after it has been opened, by a return spring 62 which is fixed to a bracket 63 and to the elongated upper end of one of the arms 49a. The cam controlled interlocking arrangement described is simpler and more practical than previous interlocking arrangements for mechanisms of this type. With the cams 39 and 59 arranged as shown, the trap doors 28 and 29 will never be opened while the trap D is occupied.

The upper pair of identical twisting cups 60 and 61, which are described in detail in the previously mentioned patents, are closed by end or hub plates 64 mounted at the terminal ends 65a and 65b of the cup shafts 65. The latter shafts are journaled in upper elongated bearings 66 provided in castings 67 which are bolted to the side walls 14a and 14b of the frames F as shown. To provide for longitudinal adjustment of the shafts 65, whereby the spacing between the twisting cups 60 and 61 may be adjusted to vary the tightness of the twist and adjust to different length dough pieces, racks 67a are formed on the outer ends of the shafts 65. Pinions 68 and 69 on shafts 70 and 71, which are supported in bearings 70a and 71a provided on the castings 67 and have handwheels 72 on the outer ends thereof, are provided for controlling the adjustment of the shafts 65. Gears 73 and 74 keyed with sliding keys on the shafts 65 oscillate the double twisting cups 60 and 61 simultaneously, but in opposite directions, through half a revolution in a manner which will be later described.

The lower twister unit T' includes double cup members 75 and 76 which are identical with the cups 60 and 61 except that they are shorter in length and are accordingly spaced a greater distance apart. Hub plates 77 similarly close the ends of the cups 75 and 76 and provide means for rigidly fixing them to cup shafts 78a and 78b which are journaled in the lower set of elongated bearings 79 provided on the castings 67. The shafts 78a and 78b are adjustable in an axial direction in a manner similar to the shafts 65 and have racks formed on the outer ends thereof in mesh with pinions 80 and 81 on adjusting shafts 82 and 83 which are journaled in bearings 84 and 85 on the castings 67 and have hand wheels 86 provided on the outer ends thereof. The disclosed arrangement, while much improved in many respects, sacrifices none of the flexibility or adjustability of the mechanism shown in Patent No. 2,337,526. Gears 87 and 88 keyed with sliding keys on the shafts 78a and 78b are in mesh with the gears 73 and 74 respectively, and when the cups 75 and 76 are oscillated in different directions through half a revolution, will operate simultaneously to oscillate the cups 60 and 61 through half a revolution as in the previously mentioned patents. Since the upper cup units 60 and 61 and the lower cup units 75 and 76 are 180° out of phase, the lower cups will be moved from the position in which they are shown, to a position in which they are ready to receive the partially twisted dough pieces while the upper cups are initially intertwining the dough pieces and dropping them to a lower cup loading trap L between the twisting cup units T and T'. The manner in which the units T and T' are controlled will be later described in detail.

The trap L comprises trap doors 89 and 90 mounted on arms 91 and 92 rigidly depending from rock shafts 93 and 94, respectively, which are journaled on the adjacent side walls 14a and 14b in bearing block 95. Fixed on the enlarged outer ends 93a and 94a of the shafts 93 and 94 are crank arms 96 and 97, respectively, which are pivotally connected as at 96a and 97a to connecting rods 98 and 99. The lower ends of the rods 98 and 99 are rigidly connected to opposite ends of a pin 100 carried by an arm 101 connected to one end of the bell crank lever 102. The lever 102 is pivotally supported on a stub shaft 102a mounted in the wall 14a and has a follower roller 102b on one end riding on a cam 103, and a roller 102c on its opposite end riding on a cam 103a. Thus, it will be plain that when the roller 102b is lifted by the cam 103, the arm 101 raises both of the rods 98 and 99, and the doors 89 and 90 simultaneously are opened to discharge the initially twisted dough pieces to the lower twisting unit T'. When the cam 103a later pushes the roller 102c outwardly, the rods 98 and 99 are pulled downwardly and the doors 89 and 90 close. With this arrangement, both of the doors 89 and 90 absolutely must move in unison and one cannot open without the other also opening.

Mounted under the lower twisting unit T' to receive the completely twisted pair of dough pieces therefrom and at the proper moment drop them to a bread pan P on an endless belt conveyor 105 which carries pans through the twisting frame, is a discharging trap A which comprises trap doors 106 and 107. These latter doors are similarly rigidly supported from rock shafts 108 and 109 respectively, by arms 108a and 109a, the shafts 108 and 109 being journaled in bushings 110 on the walls 14a and 14b. Links 111 and 112 rigidly mounted on shafts 108 and 109, respectively, are pivotally connected as at 113 to connecting rods 114 and 115 which, at their lower ends, are rigidly joined to opposite ends of a pin 116. Fixed on the pin 116 is an arm 117 connected to a bell crank lever 118 which is pivoted on a stub shaft 118a. Journaled on one end of the lever 118 is a follower roller 118b and journaled on its opposite end is a roller 118c, the rollers being adapted to ride on cams 119 and 119a which are mounted on the cam shaft 104. The cam 119 will, at the proper moment, lift the roller 118b and, accordingly, both of the rods 114 and 115 simultaneously so that the doors 106 and 107 will be opened simultaneously to charge the fully twisted dough pieces to the pan P directly underneath. Afterward, the cam 119a will push the roller 118c outwardly to return the trap doors to closed position.

A unique driving arrangement is provided for insuring that the lower twisting cups and upper twisting cups positively will be operated in absolute synchronism, and includes a stub shaft 120 which extends outwardly from the right wall 14a (FIGURES 1 and 3) and on which is pivoted a bell crank lever 121. The upper end of the lever 121 is connected at 122 to a link 123 which is in turn joined to a connecting rod 124. Pivotally connected to the upper end of the rod 124 is a crank arm 125 which is rigidly mounted on rock shaft 126. The shaft 126 is supported in a bearing 127 provided in the right side casting 67 (FIGURE 3) and has a segment gear 128 fixed thereon which is in mesh with a pinion 129 on the lower cup shaft 78a. When the roller 130 on the lever 121, which rides on a cam 131, raises the rod 124 the segment gear 128 is revolved and drives the pinion 129 and thereby the cups 75 through half a revolution. Since the gears 87 and 73 are of equal diameter, the upper twisting cup 60 is also moved through half a revolution. The lower end of the lever 121 has a roller 132 thereon which will be pushed outwardly by the cam 133 on which it rides to return the cups to original position at the proper moment, after new dough pieces have been charged to the unit T.

Similarly, a bell crank lever 134 is provided on a stub shaft 134a to drive the cups 76 and 61 by means of gears 88 and 74 which are of equal diameter. The upper end of the lever 134 is rigidly connected to a link 135 at 136, and the latter is in turn joined to a connecting rod 137. Secured to the upper end of the rod 137 is a crank arm 138 which extends rigidly from a rock shaft 138a. Shaft 138a is pivoted in a bearing 139 provided on the left casting 67 (FIGURE 3) and has a segment gear 140 rigidly joined thereto, the latter being in mesh with a pinion 141 on the shaft 78b. When the follower roller 142 on the upper end of the lever 134, which rides on a cam 143, is lifted, the rod 137 is lifted and the cups 76 and 61 are revolved through half a revolution at the same time the cups 75 and 60 are revolved. The lower end of the lever 134 has a follower roller 144 thereon which will be pushed outwardly by the cam 145, on which it rides, at the proper moment and the cups 76 and 61 are returned simultaneously with the return of the cups 75 and 60.

The cam shaft 104 is driven from a shaft 146 which has a drive sprocket 147 thereon, a chain 148 being trained around this sprocket and around a sprocket 149 on the shaft 104. The shaft 146 is in turn driven from a shaft 150 which is connected to a motor M by a chain 151 in the usual manner. A speed reducer (not shown) may be interposed between the motor M and the shaft 150 in the usual manner. The shaft 146 has a freely revolvable sleeve 152 thereon, and a single revolution clutch C' of the previously mentioned Hilliard type which includes a driving element 153 and a driven element 154 (on the shaft 146) in the form of a one-tooth ratchet wheel, releasably connects the sleeve and the shaft. Mounted on the sleeve 152 is a sprocket 155, and a chain 156 trained around this sprocket and around a sprocket 157 on the shaft 150 continuously revolves the clutch element 153. The latter element 153 would normally also continuously revolve the wheel 154, but a detent 158 fixed on a rock shaft 159 (FIGURE 1) prevents rotation of the wheel 154 and the shaft 146 with the element 153 while the tooth of the wheel is engaged as shown. When the detent 158 comes into positive engagement with the tooth of the ratchet wheel 154, the clutch C' is disengaged as noted previously and later automatically engages or is rehabilitated when the detent is released. The detent 158 is part of interlocking mechanism for operating the cam shaft 104 in synchronism with cam shaft 38 so that the twisting units T and T', traps L and A, and panstop B, which will be later described, will operate in timed relation with traps S and D. Since the operation of the latter traps is controlled by the dough pieces proceeding into the machine on conveyor 10, the operation of the mechanism which is controlled by cam shaft 104 will similarly be controlled by the incoming dough pieces and their spacing will not affect the synchronization of the mechanism with traps S and D.

When the rock shaft 159, which is journaled in bearings 160 on the walls 14a and 14b, is momentarily pivoted to lower the tooth engaging end of detent 158, the shaft 146 an the cam shaft 104 which control the operation of the twisting units T and T' and their subjacent traps can complete a single revolution. The detent 158 will reengage the tooth on wheel 154 after the latter has completed a single revolution.

Rigidly mounted on the opposite end of the shaft 159 from the clutch C' (see FIGURE 2) is a crank arm 161 which is pivotally connected to a vertical connecting rod 162. The upper end of the rod 162 is pivotally joined to a lever 163 which is pivoted on a shaft 164 on the wall 14b. The lever has a follower roller 165 in engagement with a cam 166 on a shaft 167, and the shaft 167 is driven from the shaft 26 through a gear 168 thereon and a gear 169 on the shaft 167. The gear 168 is half the diameter of gear 169, so the shaft 167 will be moved through one revolution by two revolutions of shaft 26. Thus, the cam shaft 104 will be permitted to revolve only after two dough pieces have passed flap 17, and two dough pieces have been released to twisting unit T by trap D.

The conveyor 10 is continuously driven from the shaft 150, a chain 172 around a sprocket 173 driving a sprocket 174 on the sleeve 26a and the latter sleeve 26a having a sprocket 175 thereon around which the chain 16 is trained.

The panning conveyor 105 which delivers pans under the twisting unit head and carries them away to the proofer and oven can comprise and endless belt trained around rolls (not shown) which may be driven by any suitable means such as a motor (not shown). Adapted to cooperate with the conveyor 105 is finger or stop means B for holding a pan P under the twisting head until it is loaded. The finger B is operated in timed relation to the discharge of dough pieces from the machine so as to assure the loading of each pan.

Figure 4:
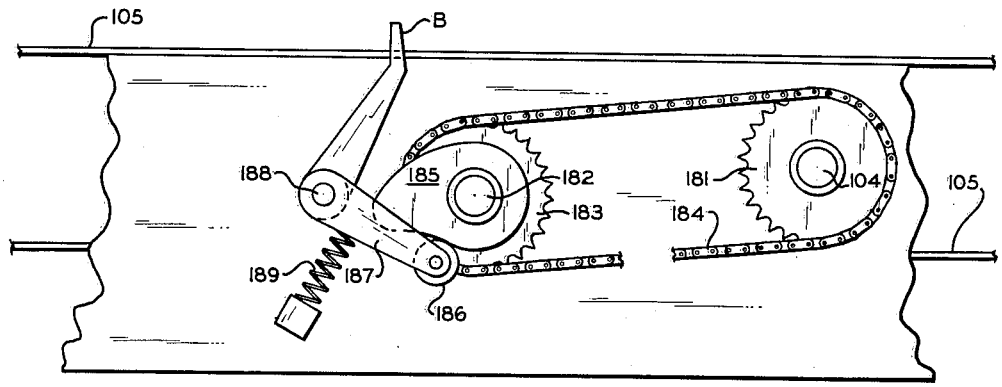
FIGURE 4 is a side elevational view showing the panning conveyor which travels under the twisting units and means for operating the pan stop associated therewith.

The pan stop operating means is best illustrated in FIGURE 4 wherein the camshaft 104 is shown as having a sprocket 181 thereon which drives a shaft 182 and a sprocket 183 on the latter through the medium of a chain 184. Mounted on the shaft 182 is a cam 185 in engagement with a follower roller 186, the latter being journaled at one end of a bell crank lever 187. The lever 186 is pivoted on the frame at 188 and has the pan stop B on the upper end thereof. When the cam 185 moves the lower end of the lever 187 in a clockwise direction after the trap A has discharged the fully twisted dough pieces to a pan P, the stop B will be lowered and the pan P will be permitted to travel on the conveyor 105 to the proofer. A spring 189 under compression promptly returns the stop B when the pan P has passed and enables the stop to hold the next pan until it receives the succeeding pair of intertwined or twisted dough pieces. This arrangement permits the stop B to operate in synchronism with the various elements of the twisting mechanism and is far more simple and reliable than other known mechanisms for controlling the pan stop.

In the operation of the apparatus described thus far, elongated dough pieces or dough rolls are delivered in longitudinally spaced relation on the conveyor 10 to the twisting machine after passing under the extender mechanism. Each dough piece must pass under the flap 17 and in so doing actuates the selector trap S to drop the preceding dough piece (in trap S) to one side or the other of the partition 33. The trap doors 28 and 29 are alternately actuated by the cam 39, as has been described, so that a dough piece is dropped first to the left section of the pairing trap D (FIGURE 1) and thence to the right section of the trap D. As has been previously stressed, the doors 28 and 29 are positively actuated so that the dough pieces will never become caught therein although the opening of the doors is controlled by succeeding dough pieces themselves. If the incoming dough pieces should not be uniformly spaced on the conveyor 10, the timing of the cam 39 is not disturbed because the cam 39 does not operate until such time as a succeeding dough piece is actually passing the flap 17. Further, the doors 49 and 50 of the trap D, which are controlled by a cam 59 on the camshaft 38, also will not be opened except when a dough piece has been charged to both sections of the trap and the trap D thence opens and closes before the trap S is again actuated. Thus, while the trap S is actuated twice (the doors 28 and 29 alternately) in the course of a single revolution of shaft 38, the trap D, because of the nature of its control cam 49, will be operated but once. It should be observed that the shaft 38 is actuated through only one half revolution by each dough piece passing flap 17, although the clutch C completes one revolution each time, because the gear 34 is but half the diameter of the gear 35. With an arrangement such as described, the possibility of the traps S and D operating out of synchronism, or the trap S charging two dough pieces to one side of the trap D, or delivering dough pieces before the trap D has discharged its dough pieces to the upper twisting unit T, is eliminated. Further, in view of the linkage 54, 56, 55, the doors 49 and 50 of the pairing station D can be opened and closed only in unison so that the station D will always charge a pair of dough pieces to the twisting unit underneath. The manner in which the elongated pairs of twisting cups 60 and 61, and 75 and 76, twist or intertwine a pair of dough pieces has been described fully in the Steadman et al. patents mentioned above and need not be described in detail here.

Briefly, however, the cups 60 and 61 are moved from an upright position through one-half revolution in different directions to intertwine the dough piece held by one with the dough piece held by the other. At the same time the cups 75 and 76, which are 180° out of phase with cups 60 and 61, are revolved in opposite directions from an inverted position to an upright position in which they can receive the partially twisted dough pieces. The trap L is provided in the embodiment under consideration to receive dough pieces from the upper unit T and release them to the lower unit T', but in certain installations, as will be pointed out, it is possible to omit the trap L and drop the twisted dough pieces directly from unit T to unit T'. When the partially twisted dough pieces are received by the cups 75 and 76, the latter are revolved reversely to their original positions, and in so doing additionally twist the dough pieces. The cups 60 and 61 are simultaneously also reversed and returned to their original positions so that they may receive the next pair of dough pieces from trap L.

It is essential that the cup units T and T' and the traps L and A be operated in synchronism with the traps S and D. Accordingly, we have perfected the arrangement shown in which a cam shaft 104 for controlling the mechanism below trap D can be operated only in timed relation with the upper camshaft 38. If the spacing of the dough pieces on conveyor 10 is not uniform so that the operation of traps S and D is not a constant per unit of time, the units T and T' will not be thrown out of synchronism with the delivering traps S and D above because the shaft 104 and the cams thereon for operating units T and T' are revolved only when the shaft 38 is revolved. The rock shaft 159 below the camshaft 104 will release the detent 158 and permit a single revolution of the shaft 104 once for every revolution traveled by shaft 38. While the cups 61 and 76, and 60 and 75, are being simultaneously revolved one-half revolution from the position in which they are shown, by the cams 143 and 133 through the medium of drive linkage comprising elements 134, 135, 137, 138, 140, 141, 88 and 74, and elements 132, 121, 123, 124, 125, 126, 128, 129, 87 and 73, the traps L and A remain closed. Thence, while the cup units T and T' remain in reversed position, the trap L is opened by the cam 103 through the medium of linkage elements 102, 101, 98 and 96, and 99 and 97, to discharge the pair of dough pieces received from unit T to unit T' and is closed again by the cam 103a through the same mechanism.

As the trap L is closing, the cups 61 and 76, and 60 and 75 are simultaneously reversed by the cams 145 and 133, respectively, through the linkage previously enumerated and return to their original position, the cups 75 and 76 dropping a completely twisted pair of dough pieces to the trap A. The latter trap A is then opened by the cam 119 through linkage elements 118, 117, 114, and 111, and 115 and 112, to drop the pair of intertwined dough pieces to a waiting pan P and is closed by the cam 119a through the same linkage mechanism. Finally, the pan stop B is lowered by the cam 185 to release the pan P as previously described and the cycle will thence be repeated after dough pieces are charged from trap D to the unit T.

As has been pointed out previously, it is possible to provide a dough piece treating or twisting machine which omits the trap beneath the twisting unit T. Such a machine is disclosed in FIGURES 5, 6 and 7 wherein dough pieces in the twisting trap T may be dropped directly to the twisting unit T'. The elimination of the trap L enables a considerable simplification of the machine to be effected, inasmuch as the means for actuating the trap L also may be dispensed with.

Figure 5:
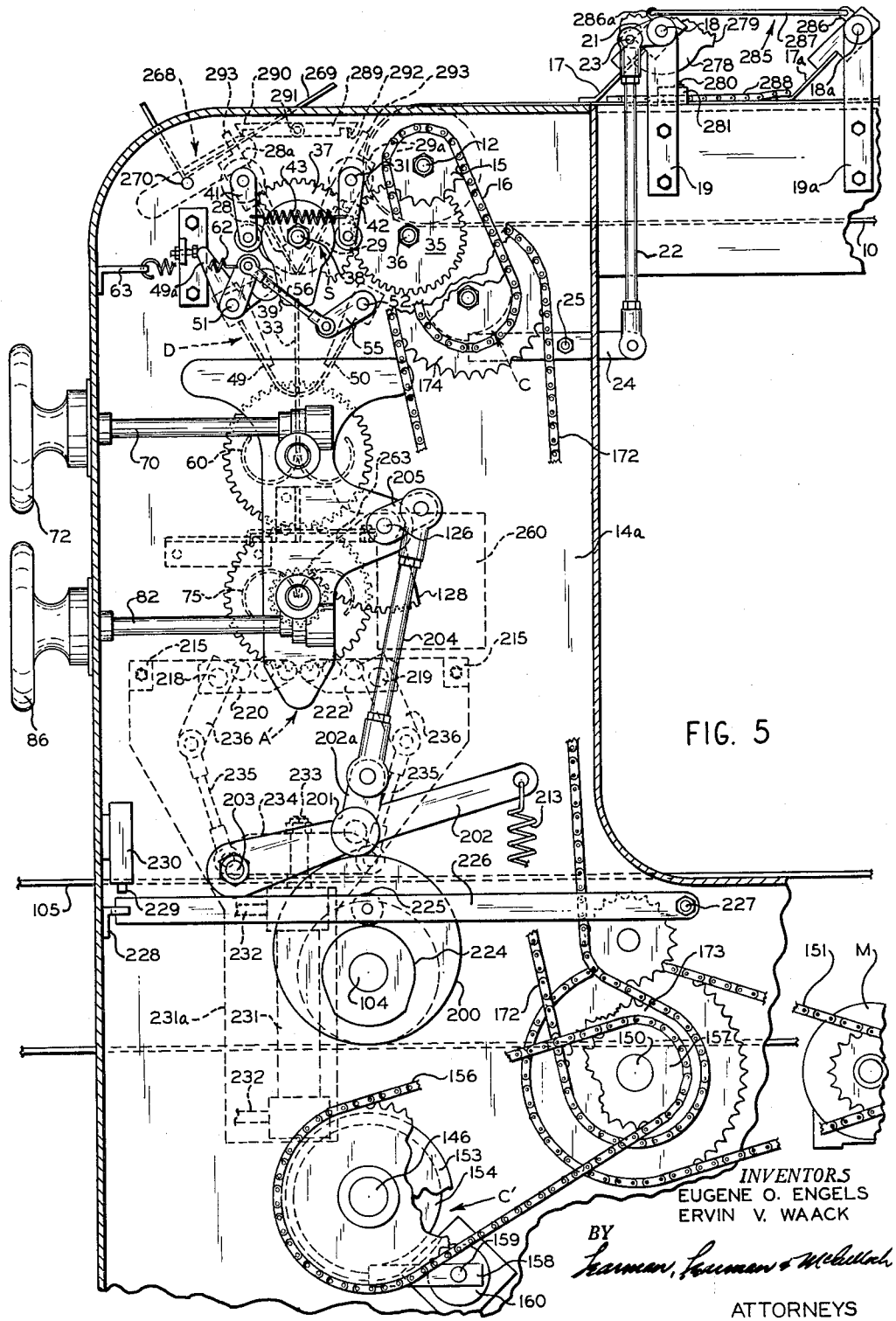
FIGURE 5 is a view similar to FIGURE 1, but showing a modified embodiment of our machine.
Figure 6:
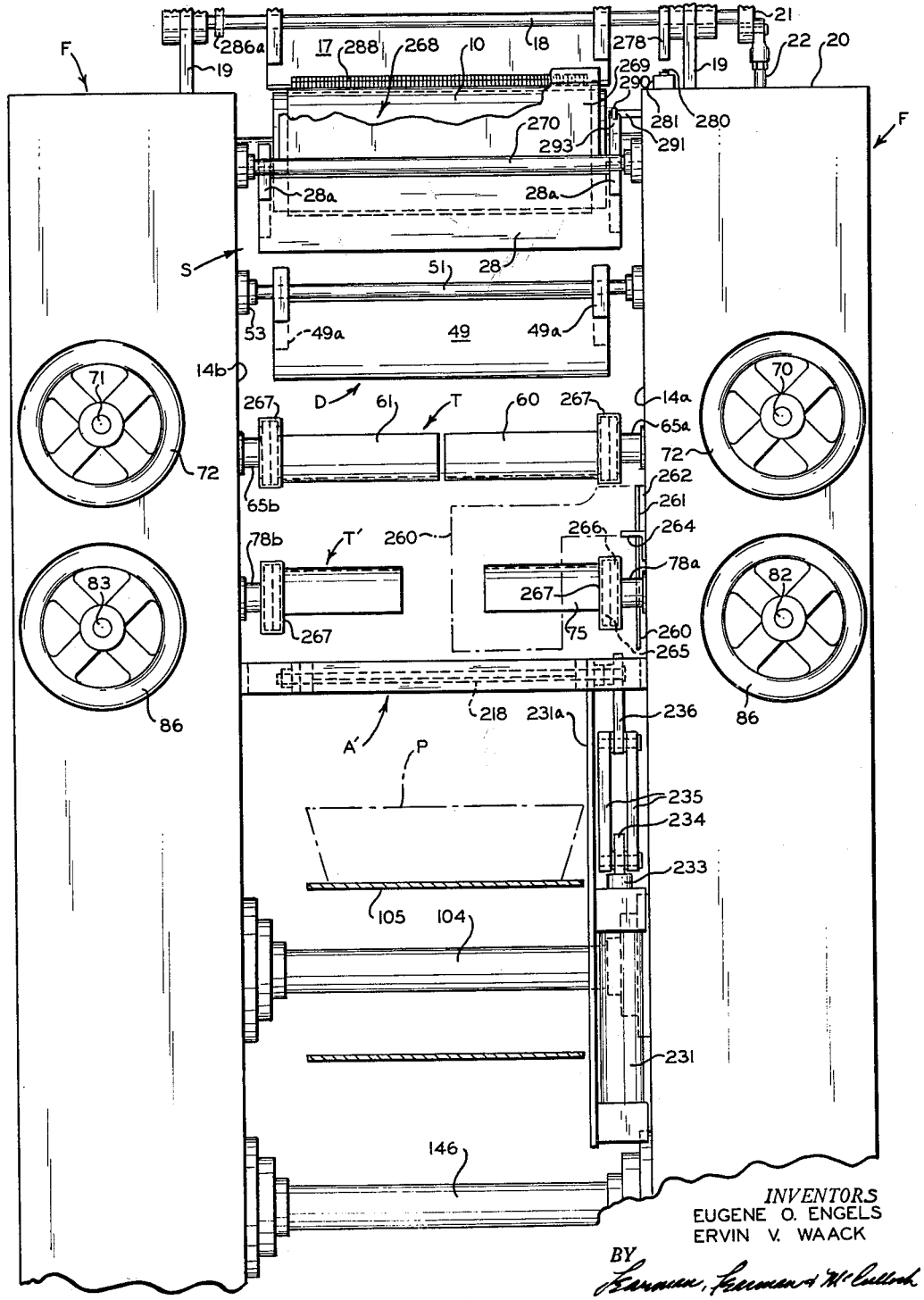
FIGURE 6 is a front elevational view of the machine shown in FIGURE 5.
Figure 7:
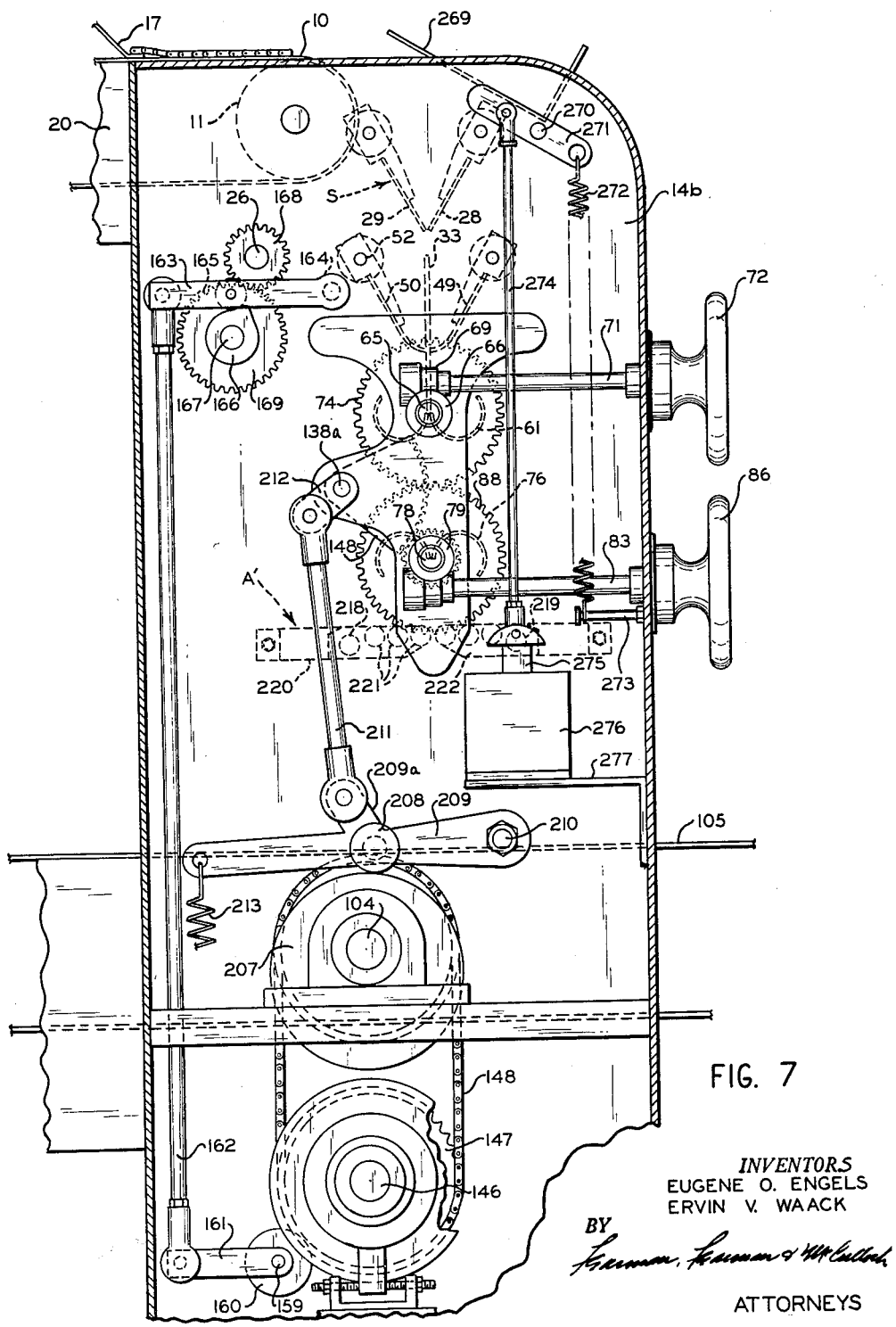
FIGURE 7 is a view similar to FIGURE 2, but showing the modified machine.

In the modified embodiment shown in FIGURES 5–7, the main shaft 104 has fixed adjacent to one end thereof a cam 200 (see FIGURE 5) which bears against a cam follower 201 rotatably journalled on an arm 202 mounted to rock about a pivot 203 on the machine frame. The arm 202 includes a projecting portion 202a to which is pivoted one end of a connecting rod 204, the other end of the latter being connected by a link 205 to the rock shaft 126. The arrangement is such that rotation of the cam 200 will effect swinging movement of the arm 202 and vertical movement of the connecting rod 204 so as to effect rocking movement of the gear segment 128, and conjoint, opposite rotation of the twisting cups 60 and 75 in the same manner as previously discussed. A similar arrangement is provided at the opposite side of the machine (see FIGURE 7) and includes a cam 207 mounted on the shaft 104 and arranged to bear against a cam follower 208 mounted on an arm 209, the latter being pivoted as at 210 on the frame. A connecting rod 211 is pivoted at one of its ends to an extension 209a of the arm 209 and at its other end to a link 212 fixed to the rock shaft 138a. The toothed segment 148 again is arranged to effect conjoint and opposite rotation of the twisting cups 61 and 76, the rotation of the cups 61 and 76 being 180° out of phase with the rotation of the twisting cups 60 and 75 so as to twist the dough pieces in the manner previously described. The arms 202 and 209 are maintained in engagement with the cams 200 and 207, respectively, by means of springs 213 secured at corresponding ends to the respective arms and having their other ends anchored to suitable brackets (not shown) mounted on the machine frame.

Figure 8:
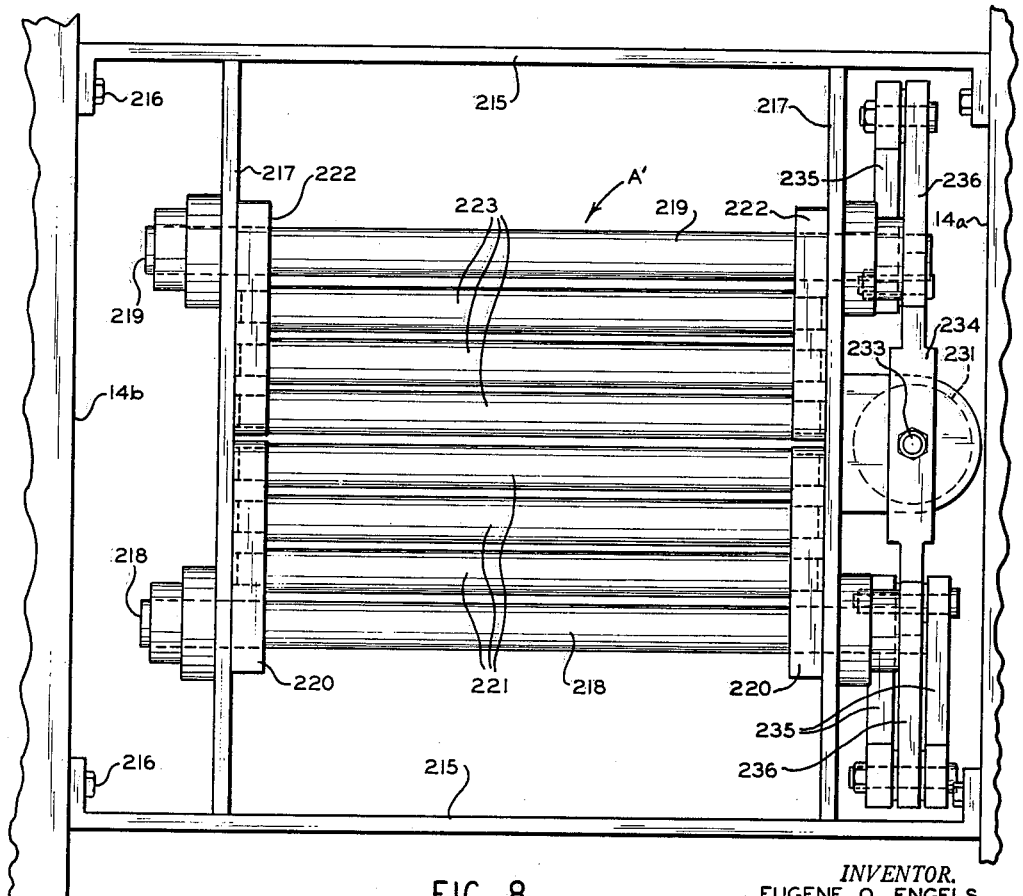
FIGURE 8 is a fragmentary, enlarged, top plan view of a portion of the modified machine.

If desired, the lower trap A disclosed in FIGURES 1, 2 and 3 may be replaced by a trap of different construction. One possible substitute for the trap A is the trap A' shown generally in FIGURES 5, 6 and 7 and more particularly in FIGURE 8. The trap A' may be mounted on front and rear frame elements 215 which may be bolted or otherwise suitably secured as at 216 to the sides of the machine. Spanning the frame elements 215 is a pair of parallel frame bars 217 and journalled in the latter are two spaced, parallel shafts 218. Fixed to the shaft 218 is a pair of mounting bars 220 constituting a part of the trap proper and in which is mounted a series of roller bars 221. A similar pair of mounting bars 222 is fixed to the shaft 219 and in the bars 222 is mounted a similar series of rollers 223. The roller bars 221 and 223 normally are maintained in substantially horizontal closed position, as is shown in FIGURE 7, but each set of roller bars is capable of movement to form an open bottom, substantially V-shaped trough through which dough pieces may be discharged by gravity into pans P carried by the conveyor 105.

Means for effecting opening and closing movement of the trap A' comprises a cam 224 (see FIGURE 5) mounted on the shaft 104 and arranged to bear against a follower 225 carried by an arm 226 having one of its ends pivoted as at 227 on the machine frame. The other end of the arm 226 is mounted in a guide 228 and is capable of movement under the influence of the cam 224 into and out of engagement with a movable valve element 229 of a valve 230 by means of which pressure fluid may be supplied from a source (not shown) to a double acting cylinder 231 through hoses 232. The cylinder may be mounted in any convenient manner such as on a plate 231a supported on the machine frame. The piston of the cylinder 231 has its piston rod 233 connected to a link 234 which in turn, is connected at its ends to connecting rods 235. The connecting rods 235 are pivoted to lever arms 236 which are fixed to the shafts 218 and 219 so that upward movement of the piston rod 233 effects rocking movement of the shafts 218 and 219 to cause downward clockwise movement of the mounting bars 220 and downward counterclockwise movement of the mounting bars 222 to effect opening of the trap A'. When the rotation of the cam 224 is such as to permit the arm 226 to drop out of engagement with the valve operator 229, fluid will be so directed to the cylinder that the piston rod 223 will be moved downwardly, thereby restoring the trap A' to its closed position.

Figure 9:
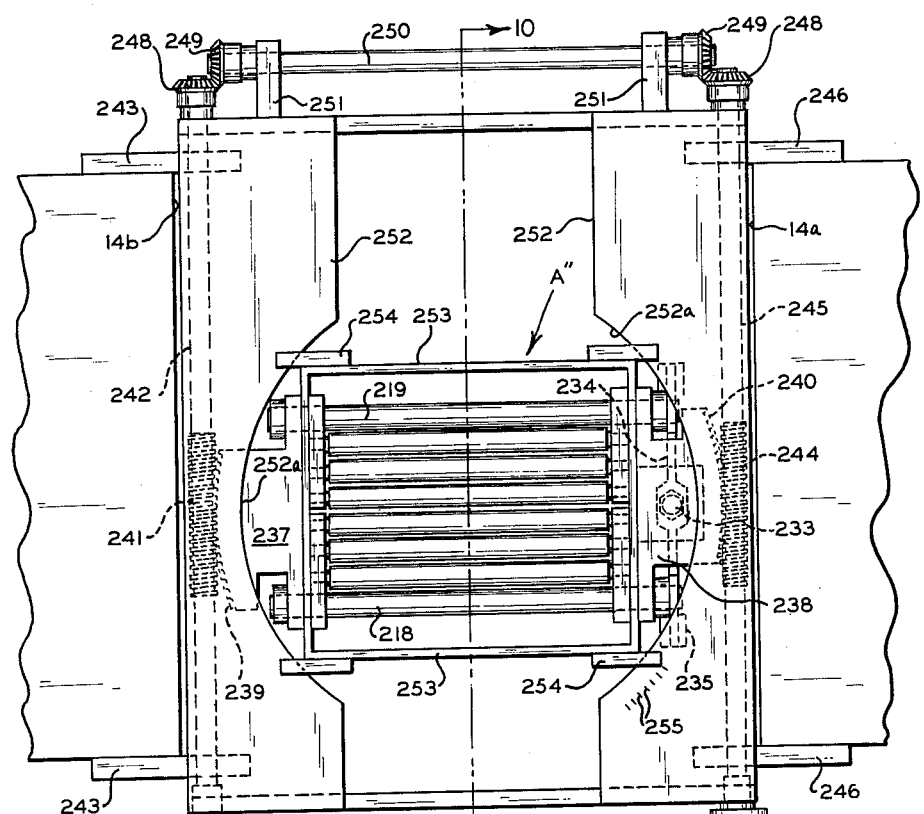
FIGURE 9 is a similar view of a modified part.
Figure 10:
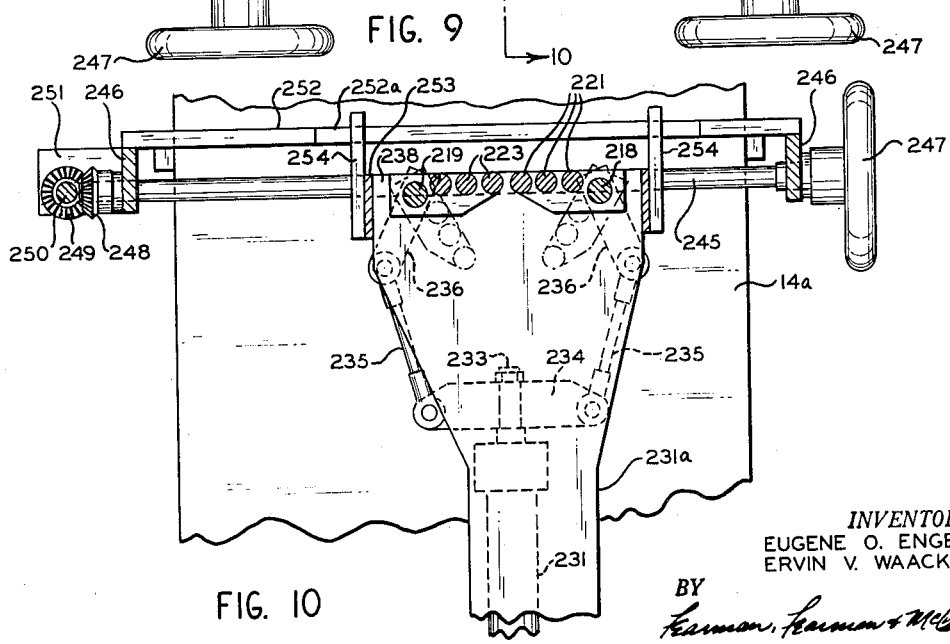
FIGURE 10 is a sectional view taken on the line 10—10 of FIGURE 9.

A modified form of trap is disclosed in FIGURES 9 and 10 and is designated by the reference character A″. In the modified embodiment, the rock shafts 218 and 219 are journaled in metal supports 237 and 238, each of which is provided with an arcuate, toothed rack section 239 and 240, respectively. The rack section 239 is in mesh with a worm gear 241 formed on a shaft 242 journaled in supports 243 mounted in the frame, and the rack section 240 is similarly in mesh with a worm gear 244 formed on a shaft 245 similarly mounted in supports 246 fixed to the machine frame. Each shaft is provided at its forward end with a hand wheel 247 and at its rearward end with a bevel gear 248 which is in mesh with a bevel gear carried at opposite ends of a shaft 250, the latter being journaled in brackets 251 secured to the machine frame. Carried by the machine frame is a pair of flanges 252 which overlie the shafts 242 and 245, and each of which is provided with an arcuate cut-out section 252a in the region of the worm gears 241 and 244. A substantially rectangular frame 253 is carried by the rock shafts 218 and 219 and the frame 253 is provided with hanger brackets 254 which extend above and overlie the flanges 252. The trap A″ includes mounting bars 220 and 222 and roller bars 221 and 223 of the kind previously disclosed and which are operated by the pressure fluid apparatus previously disclosed. In the case of the trap A″, however, the hand wheels 247 may be adjusted to swivel or vary the position of the trap A″ angularly in a horizontal plane and, if desired, indicia 255 may be provided on one of the flanges 252 adapted to be read in conjunction with one of the brackets 254 to determine the extent of angular adjustment of the trap.

The use of a roller conveyor trap such as the traps A′ or A″ permits only a slight drag to be imposed on the twisted dough pieces so as to afford regulation of the speed at which the twisted rolls are discharged, thereby assisting in preventing untwisting of the rolls. Angular or swivel adjustment of the trap is particularly advantageous when discharging twisted dough pieces into a pan P inasmuch as the trap can be so positioned that the downward movement of the twisted dough piece tends to twist the roll tighter.

The operation of the modified apparatus thus far described is similar to that previously discussed in that elongated dough pieces or rolls are delivered by the conveyor 10 to the receiver or selector trap S, the latter being operated by the passage of dough pieces under the gate 17 to drop alternate dough pieces on opposite sides of the partition 33 of the pairing trap D. Pairs of dough pieces are dropped from the trap D into the upper pairs of twisting cups 60, 61, where they are twisted and dropped directly into the lower pairs of twisting cups 75, 76. From the lower twisting cups the twisted dough pieces are deposited on the trap A′, or A″ which is actuated in the manner previously disclosed to deliver the twisted rolls to a pan P.

In the operation just described, the rolls are given four twists, one by each of the four twisting cups. However, the apparatus includes means adapted to take the place of one of the twisting cups so that the rolls are given only three twists. Referring principally to FIGURES 5 and 6, the means adapted to be substituted for one of the twisting cups comprises a plate or panel 260 supported by an arm 261 which is hingedly mounted on a bracket 262 fixed on the side wall 14a. The plate 260 is adapted to be swung from a position parallel to the side wall 14a, as shown in full lines in FIGURE 6 and in dash lines in FIGURE 5, to the chain line shown in FIGURE 6, in which position the plate is located directly below the axis of rotation of the upper pair of twisting cups 60. The plate 260 may be maintained in the latter position by means of an arm 263 (see FIGURE 5) which is pivoted at one of its ends to the plate 260 and has its other end bent for insertion into an angle flange 264.

In order to swing the plate 260 from its inactive position to its active position, it is necessary to remove a pair of twisting cups. In the disclosed embodiment, the lower pair of twisting cups 75 may be removed. To facilitate removal of the twisting cups 75, the latter are secured to one face of a disk 265 which is placed in abutting relation with a similar disk 266 provided at the end of the shaft 78a. Around the disks 265 and 266 may be placed a quickly opening and closing clamping ring 267 of known construction. The other twisting cup units and their supporting shafts may be provided with similar disks and clamping rings so as to facilitate removal of the twisting cups for cleaning. If desired, the disk 265 on each of the twisting cup units may be provided with a headed screw (not shown) which projects through an arcuate slot (not shown) in the associated shaft disk 266 so as to provide means for adjusting the twisting cups angularly relatively to their respective shafts.

One of the problems which has confronted prior dough twisting machines is the elimination of "doubles," that is, enlarged dough pieces, prior to the twisting operations. Apparatus constructed in accordance with the invention includes improved means designated generally by the reference character 268 to detect the presence of and eliminate "doubles." The appartaus 268 includes a substantially L-shaped interceptor or trough 269 rigidly mounted on a rock shaft 270 which is journaled at its ends in the side panels 14a and 14b. At one end of the shaft 270 is rigidly mounted a lever 271 (see FIGURE 7) receiving at one of its ends one end of a spring 272, the other end of the spring being secured to a post 273 mounted on the front wall of the frame. Pivoted adjacent to the other end of the lever 271 is one end of a link 274, the other end of the link being pinned to the armature 275 of a solenoid 276. The solenoid 276 may be mounted on a bracket 277 that is welded or otherwise suitably secured to the front wall of the machine frame. The trough 269 normally is maintained in such position by the spring 272 that dough pieces may be delivered from the conveyor 10 into the selector trap S without interference from the trough.

Referring now to FIGURE 5, the shaft 18 on which the flap 17 is mounted also is provided with a cam disk 278 which rocks with the shaft 18. The cam 278 is equipped with a lobe 279 which is adapted to engage a switch arm 280, under centain conditions, to close a switch 281 and energize the solenoid 276 so as to attract the armature 275 and effect counterclockwise movement of the trough 269, as viewed in FIGURE 7, and thereby interpose the trough in the path of a dough piece traveling on the conveyor 10.

The locations of the cam lobe 279 and the switch arm 280 are such that the rocking movement of the shaft 18 and the cam 278 by the passage of a single dough roll under the flap 17 is insufficient to effect engagement of the lobe 279 and the switch arm 280. As a result, the trough 269 will remain in the position shown in FIGURE 5. When an enlarged dough piece or "double" passes under the flap 17, however, the shaft 18 and the cam 278 will be rotated a greater amount so as to effect closing of the switch 281 and the resultant movement of the interceptor 269 into the path of the dough piece. The interceptor 269 will remain in this position as long as the solenoid armature 275 is attracted, and the angular extent of the lobe 279 is sufficiently great to assure the attraction of the armature for the required length of time.

It has been pointed out how apparatus constructed in accordance with the invention may be used to impart either three or four twists to dough pieces. Moreover, either of the embodiments disclosed in the drawings easily may be converted to a single panning machine, that is, one in which single dough pieces are deposited in the pans. For convenience, the apparatus for converting the machines to single panning is disclosed in connection with the embodiment of the invention shown in FIGURES 5 through 7, but it should be understood that the apparatus is adaptable to either embodiment.

It will be recalled from the description of the embodiment of the invention shown in FIGURES 1-3, that the mechanism for opening the doors of the pairing trap D is not effective until two dough pieces have been discharged through the selector trap S and are positioned one on either side of the partition 33. In order to adapt the apparatus for operation as a single panning machine, it is necessary, therefore, to effect opening of the trap D in timed relation to the passage of single or individual dough pieces from the selector trap. Stated differently, the operation of the trap D must be timed to open after a single dough piece has been discharged thereto from the selector trap S.

Mechanism for effecting opening of the trap D in timed relation to the delivery of individual dough pieces thereto is indicated in FIGURE 5 by the reference character 285 and comprises a flap or gate 17a, similar in all respects to the flap 17, and which is fixed on a shaft 18a that is journaled at its ends in bearing brackets 19a similar to the brackets 19. Fixed on the shaft 18a is a lever 286 and a similar lever 286a is fixed on the shaft 18. A motion transmission bar 287 spans the levers 286 and 286a and has one of its ends removably hooked in an opening in the lever 286 and its other end removably hooked in a similar opening in the lever 286a so that rotation or rocking movement of one of the shafts 18 or 18a is transmitted to the other.

In the disclosed arrangement of parts, a single dough piece carried by the carrier 10 first will pass beneath the gate 17a and swing the latter in a clockwise direction, as is viewed in FIGURE 5, and the movement of the gate 17a will be transmitted via the rod 287 to the gate 17 to impart swinging movement to the latter and effect movement of the connecting rod 22 and operation of the clutch mechanism C in the manner previously described, whereby the traps S and D will be operated. As the dough piece approaches the gate 17 and passes under the latter, the clutch mechanism C again will be operated to effect operation of the traps S and D. Thus, each single dough piece being advanced to the selector trap S will actuate the clutch mechanism C twice so as to double the speed of operation of the trap D. In other words, the trap D will open in accordance with the delivery of single dough pieces thereto. Moreover, the speed of operation of the twisting units, the discharge traps, and the pan stop B also will be adjusted in timed relation to the delivery of single dough pieces in view of the dependence of the operating mechanism of these parts on the actuation of the clutch C.

Inasmuch as the speed of the conveyor 10 originally will have been set to deliver dough pieces to the twisting mechanism at a rate most conducive to efficient twisting operations, it is necessary that the rate of delivery of dough pieces for single panning operations be so adjusted as to preclude the possibility of dough pieces piling up in the dough treating parts of the apparatus. A simple and effective manner of adjusting the speed at which the dough pieces are delivered to the apparatus is to provide a mesh screen 288 on the gate 17a and under which dough pieces must travel. The speed at which dough pieces will travel under the screen 288 will be exactly one half the speed at which they normally travel on the conveyor 10 and the length of the screen 288 may be such as to assure delivery of dough pieces to the trap S at a speed in timed relation to the operation of the latter.

In single panning operations, it may be desirable to lock one or the other of the doors of the selector trap S open so as to prevent the discharging of dough pieces on alternate sides of the partition 33 in the pairing trap D. Accordingly, locking means may be provided and, in the embodiment of the invention shown in FIGURES 5 and 6, the locking means comprises a pair of latch bars 289 and 290 pivoted at corresponding ends on a post 291 mounted on the side wall 14b of the machine frame. The opposite end of each of the latch bars is notched as at 292 for reception of an extension finger 293 provided on each of the door arms 28a and 29a. To latch one of the doors of the trap S open, one of the latch bars 289 or 290 is swung from its vertical position to a substantially horizontal position and the corresponding door 28 or 29 is swung to a position where its extension 28a or 29a is received in the notch 290 or 292.

To facilitate single panning operations, it may be desirable to remove the partition 33 from the pairing trap D. If so, the removal may be effected in the manner disclosed in the aforementioned Patent No. 2,337,527.

When the apparatus is conditioned for single panning operations, a single dough piece will be delivered to the trap D through the open selector trap S. The next succeeding dough piece will trip the clutch C in the manner described so as to open the trap D and initiate operation of the twist units T and T' and the lower discharge trap. Since each dough piece trips the clutch element C twice, the twisting units T and T' will return to the positions shown in FIGURE 5, that is, in readiness to receive a dough piece from the trap D, in timed relation to the delivery of single dough pieces to the latter. Since the operation of the twisting units, discharge trap, and pan conveyor 105 is timed to the delivery of dough pieces to the selector trap S, the pans P will be located under the discharge trap A' or A" in ample time to receive a discharged single dough piece and then will be carried away by the conveyor 105.

When converting from single panning operations to twisting operations, it is necessary only to remove the motion transmitting bar 287 which interconnects the gates 17 and 17a. The conversion, therefore, may be accomplished simply and rapidly.

From the foregoing description it will be clear that machines constructed according to the invention are capable of treating dough pieces in accordance with any one of a number of predetermined plans. One such plan requires the conditioning of the machine to deliver four-twist rolls; another requires the conditioning of the machine to deliver three-twist rolls; and still another requires the conditioning of the machine to deliver single, untwisted rolls. Irrespective of the manner in which the machine is arranged to operate, the operation of each of its several parts is so timed as to be correlated to the delivery of dough pieces to the machine, thereby assuring orderly and accurate functioning of the apparatus. Moreover, the machine may be adjusted as hereinbefore disclosed to change the plan of its operation, and the adjustment easily and quickly may be effected. Accordingly, a machine formed in accordance with the invention may serve either as a twisting unit or as a single panning unit, thereby dispensing with the necessity of providing two machines, one for performing each function.

This application is a continuation in part of application Serial No. 526,915, filed August 8, 1955, and now abandoned.

The disclosed embodiments are representative of presently preferred forms of the invention, but the disclosure is intended to be illustrative rather than definitive thereof. The invention is defined in the claims.

We claim:
1. A dough piece handling machine adapted to receive dough pieces from a delivery apparatus and treat them, said machine comprising trap means into which dough pieces are delivered by said apparatus; first operating means connected to said trap means for operating the lattter to discharge dough pieces therefrom; treating means located in a position to receive dough pieces discharged from said trap means and treat said dough pieces; second operating means connected to said treating means for operating the latter; actuating means, located in its entirety remotely from said trap means in the path of and actuated by each dough piece delivered to said trap means, operative independently of the deposit of the dough pieces in said trap means; means interconnecting said actuating means and said first operating means for operating said trap means solely in response to actuation of said actuating means for discharge of dough pieces to said treating means; and means interconnecting said first and second operating means responsive to operation of said first operating means to operate said treating means in timed relation to the discharge of dough pieces from said trap means.

2. A dough piece twisting machine adapted to receive dough pieces from a delivery apparatus and twist them, said machine comprising trap means into which dough pieces are delivered by said delivery means; first operating means connected to said trap means for discharging dough pieces therefrom; twisting means located in a position to receive dough pieces from said trap means and twist said dough pieces; second operating means connected to said twisting means for operating the latter; actuating means located, in its entirety remotely from said trap means in the path of and actuated by each dough piece delivered to said trap means, operative independently of the deposit of the dough pieces in said trap means; means interconnecting said actuating means and said first operating means for operating said trap means solely in response to actuation of said actuating means for discharge of dough pieces to said twisting means; and means interconnecting said first and second operating means responsive to operation of said first operating means for operating said twisting means in timed relation to the discharge of dough pieces from said trap means.

3. A dough piece twisting machine comprising trap means into which dough pieces may be delivered; first operating means connected to said trap means for operating the latter to discharge dough pieces therefrom; twisting means located in a position to receive dough pieces discharged from said trap means and twist the dough pieces; second operating means connected to said twisting means for operating the latter to twist dough pieces and discharge twisted dough pieces therefrom; actuating means located in the path of and actuated by each dough piece delivered to said trap means; means connecting said actuating means and said first operating means for operating said trap means solely in response to actuation of said actuating means for discharge of dough pieces to said twisting means; means interconnecting said first and second operating means responsive to the operation of said first operating means for operating said twisting means in timed relation to the discharge of dough pieces from said trap means; discharge trap means located in a position to receive dough pieces directly from said twisting means and being operable to discharge the dough pieces from said machine; and means connected to said discharge trap means for operating the latter.

4. A machine as set forth in claim 3 wherein said discharge trap means comprises a pair of normally closed doors, the operating means for said discharge trap means being effective to open said doors in timed relation to the discharge of dough pieces from said twisting means.

5. A machine as set forth in claim 3 wherein said discharge trap means comprises a plurality of rotatable members and means supporting said rotatable members for rocking movement from a position to receive and support dough pieces discharged from said twisting means, to a position such that dough pieces are discharged from said rotatable members by gravity.

6. A machine as set forth in claim 5 wherein said supporting means for said rotatable members is mounted for swiveling movement.

7. A machine as set forth in claim 6 including means connected to said supporting means for effecting swiveling movement of the latter.

8. Apparatus for twisting dough pieces comprising a frame; trap means on said frame in a position to receive dough pieces from a delivery means; twisting means on said frame in a position to receive dough pieces discharged from said trap means; a source of continuous motive power; first normally ineffective driving means interconnecting said source of power and said trap means; second normally ineffective driving means interconnecting said source of power and said twisting means; actuating mechanism on said frame in position to be tripped by each dough piece delivered to said trap means; means responsive to tripping of said mechanism for rehabilitating said first mentioned driving means and thereby actuating said trap means to discharge dough pieces to said twisting means; and means connecting said first mentioned driving means and said second mentioned driving means to rehabilitate the latter and operate the twisting means in correlation with the operation of said trap means.

9. The combination defined in claim 8 including panning conveyor means under said twisting means; a pan stop control supported on said frame; and means connecting said second mentioned driving means to said pan stop control to operate the latter in accordance with the operation of said twisting means.

10. Apparatus for receiving individual dough pieces from a delivery device and pairing them, said apparatus comprising selector means so located relatively to said delivery device as to receive dough pieces therefrom; pairing trap means located in a position to receive dough pieces discharged from said selector means, said pairing trap means including a dividing partition therein; driving means drivingly connected to said selector means for operating the latter to discharge alternate dough pieces therefrom on opposite sides of said partition; and actuating means operatively connected to said driving means for initiating operation of the latter, said actuating means being located in the path of dough pieces delivered to said first trap means.

11. Apparatus for pairing dough pieces comprising a partition, a superjacent selecting means operable to deliver dough pieces alternately to first one side and then to another side of said partition, means carrying dough pieces in spaced sequence to said selecting means, continuously operating motor driven means, a single revolution clutch including a one toothed ratchet wheel operable to engage said selector means and said motor driven means, a detent in engagement with said wheel normally preventing engagement of said selector means and said motor driven means, a pivotal flap raised by each dough piece as it proceeds toward said selector means, and linkage connecting said flap and detent to disengage the latter from said wheel and permit engagement of said wheel and said motor driven means for operating said selector means in accordance with the passage of each dough piece.

12. The combination defined in claim 11 in which said selector means comprises a pair of oppositely disposed, adjacent doors forming a support surface, rock shafts on which each door is mounted, followers on said rock shafts, a cam therebetween configured so that first one follower and then the other is moved to rock said shafts and alternately open and close said doors, and said means including the clutch is connected to said cam in a manner to move said cam sufficiently only to actuate one follower and rock shaft on one release of said detent.

13. Apparatus for pairing dough pieces including a selecting trap comprised of a pair of vertically converging doors in abutting engagement at the lower edges thereof, spaced apart rock shafts rigidly secured to the upper edges thereof, a camshaft including a cam thereon between said shafts, the cam being configured to actuate first one follower and then the other and open the doors alternately, followers fixed on said rock shafts, a cam having the followers riding thereon, a central partition below the line of convergence of said doors, means in position to be tripped by said dough pieces proceeding to the trap, and motive power means normally held out of driving engagement with said camshaft released by said latter means to drive said cam shaft.

14. The combination defined in claim 13 in which said latter means includes a normally disengaged, single revolution clutch and gearing connecting the driven element of the clutch and cam shaft so that it revolves only half a revolution for every revolution of the said element of the clutch.

15. The combination defined in claim 13 in which vertically converging, abutting trap doors forming a dividing trap are provided under the selecting trap on opposite sides of the partition, rock shafts fixed to the upper edges of said doors, a follower on one of said rock shafts, a cam on said camshaft actuating said follower once during a revolution of said camshaft and after each of said selector doors has been opened, and linkage connecting said dividing trap doors for operation in unison.

16. The combination defined in claim 13 in which twisting cup units are provided below said trap, a second, transversely disposed cam shaft, cam means riding thereon for operating the twisting cups, means for driving said latter camshaft held out of driving engagement therewith, and mechanism connecting the latter means and the motive power means for driving the first mentioned camshaft for releasing the said latter means to operate the twisting cups when the first mentioned camshaft is driven.

17. Apparatus for twisting dough pieces comprising a frame, means for conveying dough pieces to the apparatus, a partition supported on the frame, selecting means supported on the frame between the conveyor and partition in the path of dough pieces conveyed to the apparatus for alternately discharging them to the opposite sides of the partition, a drive shaft supported on the frame for operating said selector means, means operatively connecting said selector means and said drive shaft and comprising a normally disengaged first single revolution clutch on said shaft, twisting cups supported on the frame under said trap, a camshaft connected to said twisting cups for revolving said twisting cups, a rock shaft supported on the frame, means operatively connecting said cam shaft and said rock shaft and comprising a second normally disengaged single revolution clutch, engaging means connected to said first clutch and located in position to be tripped by the passage of dough pieces to the apparatus and operable to engage said clutch when each dough piece passes said engaging means, and mechanism connecting said drive shaft with the rock shaft to pivot the same and engage said second clutch when said drive shaft operates said selector means.

18. The combination defined in claim 17 in which said latter mechanism comprises a crank on said rock shaft, a connecting rod for said crank, a pivotal lever joined to said rod, a camshaft with a cam thereon for lifting said lever and thereby said rod at a predetermined time, and means driving said latter camshaft from said drive shaft when the latter is operating the selector means.

19. The combination defined in claim 17 in which said cups comprise two twisting units disposed one above the other, each unit composed of two, spaced, rotative cup members mounted for rotation on aligned axes, means connecting the vertically aligned members of the respective units for rotation in unison, cams on the twisting cup camshaft, segment gears for oscillating the means connecting the said vertically aligned members for rotation through half a revolution, rock shafts on which said gears are mounted, bell crank levers, and linkage connecting the levers to said gear rock shafts, the levers having one leg in engagement with one of said cams for oscillating the gears in one direction and the other leg in engagement with another of said cams for returning the same.

20. The combination defined in claim 17 in which traps are mounted under each twisting unit, each trap comprising a pair of vertically converging doors mounted on a pair of spaced rock shafts, bell crank levers with each end thereof in engagement with different cams on the twisting cup camshaft, a link on each lever, and linkage connecting each of said links with one of the rock shafts to open and close the trap doors in unison in accordance with the configuration of said cams.

21. The combination defined in claim 17 in which a panning conveyor runs under said twisting cups, a pivotally mounted member with a pan stop thereon normally projects above said conveyor to hold a pan under the cups, a cam revolved by said twisting cup camshaft for controlling said pan stop member, and means in engagement with said latter cam transmitting the throw thereof to said pan stop member to lower the pan stop in correlation with the operation of the twisting cups.

22. A dough piece handling machine adapted to receive dough pieces of substantially uniform size from a delivery apparatus and treat them, said machine comprising frame means; receiving means on said frame means into which dough pieces of said substantially uniform size may be delivered by said apparatus; dough piece interceptor means; means mounting said interceptor means on said frame means for movement to and from first and second positions, one of said positions being such that said interceptor means lies in the path of dough pieces delivered to said receiving means and the other position being such that said interceptor means is clear of the path of dough pieces delivered to said receiving means; detecting means supported on said frame means in a position to gauge the size of dough pieces delivered to said receiving means; means interconnecting said detecting means and said interceptor means operable in response to the detection of a dough piece of a size other than said substantially uniform size to move said interceptor means into the path of said other size dough piece and prevent its delivery to said receiving means; dough piece treating means supported by said frame means in a position to receive dough pieces from said receiving means and treat said discharged dough pieces; operating means connected to said receiving means operable to discharge dough pieces therefrom; actuating means constituted in part by said detecting means and located in the path of and actuated by dough pieces delivered to said receiving means; and means interconnecting said actuating means and said receiving means operating means for actuating the latter in timed relation to the delivery of dough pieces to said receiving means.

23. A machine as set forth in claim 22 wherein said dough piece treating means comprises twisting means located in a position to receive dough pieces discharged from said receiving means; driving means connected to said twisting means operable to drive the latter to twist dough pieces therein; and means interconnecting said driving means and said receiving means operating means for operating said driving means in timed relation to the discharge of dough pieces from said receiving means.

24. A machine as set forth in claim 23 including discharge trap means located in a position to receive twisted dough pieces from said twisting means; operating means connected to said discharge trap means effective to open and close the latter; and means interconnecting said discharge trap means operating means and said twisting means driving means for opening and closing said discharge trap means in timed relation to the discharge of dough pieces from said twisting means.

25. A dough handling machine adapted to receive dough pieces from a delivery device and twist them in accordance with a predetermined plan, said machine comprising a frame; a first pair of twisting units into which a pair of dough pieces may be delivered; means mounting each of the units of said pair of units on said frame for rotation in such direction as to twist said pair of dough pieces and discharge them; means connected to said pair of units for rotating the latter; a second pair of twisting units; means mounting each unit of said second pair of twisting units on said frame in a position to receive twisted dough pieces from said first pair of units and for rotation in such direction as to twist said dough pieces again, the mounting means for one of said pairs of twisting units including means for removably mounting at least one of the units of said one of said pairs of twisting units; means connected to said second pair of units for rotating the latter, the rotation of both pairs of twisting units being such as to twist a pair of dough pieces a predetermined number of times; a panel member; and means on said frame for mounting said panel member in a fixed position on said frame in place of said removable twisting unit when the latter is removed, the arrangement being such when said panel member replaces said removable twisting unit that fewer twists are given to a pair of dough pieces.

26. A dough handling machine for receiving dough pieces from a delivery device and being adapted for use optionally as a twisting machine or a single panning machine, said machine comprising normally closed receiving means into which dough pieces may be delivered individually by said delivery means; operating means connected to said receiving means operable to open the latter to discharge individual dough pieces therefrom; actuating means positioned in the path of and actuated by dough pieces delivered to said receiving means; means interconnecting said actuating means and said operating means for opening said receiving means in timed relation to the delivery of dough pieces thereto; normally closed pairing trap means located in a position to receive dough pieces discharged from said receiving means; operating means connected to said pairing trap means for opening the latter to discharge dough pieces therefrom; means interconnecting the operating means of said pairing trap means and the operating means for said receiving means for opening said pairing trap means in timed relation to the discharge of dough pieces from the latter, the rate of operation of said pairing trap means to discharge dough pieces therefrom being at one half the rate of operation of said receiving means so as normally to discharge pairs of dough pieces from said pairing trap means; means located in a position to receive pairs of dough pieces discharged from said pairing trap means and twist said pairs of dough pieces together; latch means removably connected to said receiving means for optionally maintaining the latter open; auxiliary actuating means located in the path of and actuated by dough pieces delivered to said receiving means; and transmission means removably interconnecting said auxiliary actuating means to effect operation of said pairing trap means at twice its normal rate of operation, whereby said pairing trap means may be operated to discharge individual dough pieces therefrom.

27. A machine as set forth in claim 26 wherein said receiving means comprises a pair of normally closed doors, and wherein said latch means comprises at least one latch bar removably engaging one of said doors to maintain it in its open position.

28. A machine as set forth in claim 26 wherein said auxiliary actuating means and said actuating means each comprises a pivoted gate and wherein said transmission means comprises a device for transmitting pivotal movement of the gate of said auxiliary actuating means to the gate of said actuating means.

References Cited in the file of this patent

UNITED STATES PATENTS

| | | |
|---|---|---|
| 1,906,847 | Fitzerald | May 2, 1933 |
| 2,129,230 | O'Neil | Sept. 6, 1938 |
| 2,243,649 | Pearson | May 27, 1941 |
| 2,337,527 | Steadman et al. | Dec. 21, 1943 |
| 2,611,484 | Sawyer et al. | Sept. 23, 1952 |
| 2,706,042 | Mandeville | Apr. 12, 1955 |
| 2,843,062 | Kieffaber | July 15, 1958 |
| 2,893,534 | Sexauer | July 7, 1959 |